(12) United States Patent
Kroupenkine

(10) Patent No.: US 6,674,940 B2
(45) Date of Patent: Jan. 6, 2004

(54) MICROLENS

(75) Inventor: Timofei N. Kroupenkine, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 115 days.

(21) Appl. No.: 10/021,458

(22) Filed: Oct. 29, 2001

(65) Prior Publication Data

US 2003/0081896 A1 May 1, 2003

(51) Int. Cl.$^7$ ................................................. G02B 6/32
(52) U.S. Cl. ........................................... 385/33; 65/387
(58) Field of Search ........................ 385/33–35; 65/387

(56) References Cited

U.S. PATENT DOCUMENTS

| | | |
|---|---|---|
| 3,670,130 A | 6/1972 | Greenwood |
| 4,030,813 A | 6/1977 | Kohashi et al. ............. 350/161 |
| 4,067,937 A * | 1/1978 | Unno et al. ................. 264/1.26 |
| 4,118,270 A * | 10/1978 | Pan et al. ........................ 216/24 |
| 4,137,060 A * | 1/1979 | Timmermann ................. 65/31 |
| 4,265,699 A * | 5/1981 | Ladany .......................... 216/97 |
| 4,338,352 A * | 7/1982 | Bear et al. ...................... 427/8 |
| 4,406,732 A | 9/1983 | Kayoun |
| 4,569,575 A | 2/1986 | Le Pesant et al. |
| 4,653,847 A | 3/1987 | Berg et al. |
| 4,671,609 A * | 6/1987 | Khoe et al. .................... 385/33 |
| 4,708,426 A * | 11/1987 | Khoe ............................. 385/43 |
| H445 H * | 3/1988 | Bock et al. .................. 264/1.7 |
| 4,867,521 A | 9/1989 | Mallinson |

(List continued on next page.)

FOREIGN PATENT DOCUMENTS

| | | |
|---|---|---|
| DE | 196 23 270 A | 1/1998 |
| FR | 2 769 375 A1 | 4/1999 |
| JP | 58057104 A * | 4/1983 ............ G02B/7/26 |
| JP | 61255903 | 11/1986 |
| JP | 08043678 A * | 2/1996 ............ G02B/6/32 |
| WO | WO 00/75700 A1 | 12/2000 |

OTHER PUBLICATIONS

Schilling, Andreas et al., Surface Profiles of Reflow Microlens Under the Influence of Surface Tension and Gravity, *Opt. Eng.* 39(8) pp. 2171–2176, Society of Photo–Optical Instrumentation Engineers, Aug. 2000.

Danzebrink, R. et al., "Deposition of Micropatterned Coating Using an Ink–Jet Technique," *Thin Solid Films* 351, pp. 115–118, Elsevier Science S.A. (1999).

Feng, Chuan Liang et al., "Reversible Wettability of Photoresponsive Flourine–Containing Azobenzene Polymer in Langmuir–Blodgett Films," *Langmuir* Vol. 17, No. 15, 2001, pp. 4593–4597, American Chemical Society, published on Web Jun. 22, 2001.

Ichimura, Kunihiro et al., "Light–Driven Motion of Liquids on a Photoresponsive Surface," *www.sciencemag.org*, SCIENCE, Vol. 288, Jun. 2, 2000, pp. 1624–1626.

Washizu, Masao, "Electrostatic Actuation of Liquid Droplets for Microreactor Applications," IEEE Transactions on Industry Applications, Vol. 34, No. 4, Jul./Aug. 1998, pp. 732–737.

*Primary Examiner*—Akm Enayet Ullah
*Assistant Examiner*—M. R. Connelly-Cushwa

(57) ABSTRACT

An optical fiber assembly has a microlens joined to the face of an optical fiber. The microlens is made from a material which, when liquid, adheres to the face. The microlens can have a focal point which defines an optical path between the surface of the microlens and the optical fiber's core. This assembly can be formed by applying liquid such a pre-dispensed droplets of liquid to the optical fiber so that the liquid adheres to the optical fiber as a droplet at the face, and solidifying the droplet to form the microlens. The droplet's shape can be altered as it solidifies.

18 Claims, 3 Drawing Sheets

U.S. PATENT DOCUMENTS

| | | |
|---|---|---|
| 4,948,214 A | 8/1990 | Hamblem |
| 5,169,677 A * | 12/1992 | Sangyoji et al. ............ 427/581 |
| 5,412,746 A | 5/1995 | Rossberg |
| 5,486,337 A | 1/1996 | Ohkawa |
| 5,518,863 A | 5/1996 | Pawluczyk |
| 5,659,330 A | 8/1997 | Sheridon |
| 5,718,830 A | 2/1998 | Hlinka et al. |
| 6,014,259 A | 1/2000 | Wohlstadter |
| 6,369,954 B1 | 4/2002 | Berge et al. ................. 359/666 |
| 6,488,414 B1 * | 12/2002 | Dawes et al. ................. 385/79 |
| 2001/0033712 A1 * | 10/2001 | Cox et al. ..................... 385/33 |

* cited by examiner

MICROLENS

FIELD OF THE INVENTION

The present invention is directed generally to the construction of optical fibers, and, more particularly, to the formation of an optical fiber having a terminal lens.

BACKGROUND OF THE INVENTION

Photonic devices often employ optical fibers to guide efficiently and control light passing therebetween or therethrough. More specifically, the optical fibers can transfer light between optical devices, guide light to components in the device, transfer light to other optical fibers, or receive light from components in the device or other optical fibers. Such optical fibers typically have a light-transmitting core surrounded by a light confining cladding. The core and cladding have diameters on the order of 8–150 μm and 100–700 μm, respectively, depending on the type of the fiber (single or multi mode) and fiber material (glass or plastic).

Although light can enter or exit the core of an optical fiber directly, the small size of the core means that precise alignment of the core and the light's source or destination will be required. One way to comply with optical fibers' precise alignment requirements is to place a collimating lens near the end of the optical fiber; the lens has optical properties and is positioned such that light which would otherwise not enter the optical fiber core is directed into the center of the optical fiber. That is, the lens guides light into the optical fiber's core.

One known mounting scheme affixes a microlens to the end of the optical fiber. While this arrangement can comply with optical fiber's stringent alignment requirements, the procedure for mounting the microlens on the optical fiber itself complicates the manufacturing process; if not done properly, the optical fiber and lens will not be coupled correctly, reducing optical performance. Since the effective coupling of fibers and lenses is required in a wide range of photonic applications, such as detectors/lasers, cross-connect devices, etc., great care will have to be taken when using this technique to join the fiber and lens to insure proper alignment and mounting.

At the present time, coupling of the optical fiber and lens is performed manually. Owing to the close tolerances and precise alignments involved, this presents substantial challenges. Manually mounting the microlens to the optical fiber generally is a slow and expensive procedure, in part because it is done using active alignment of the optical components, and in part because only one microlens and fiber can be joined at a time. Further, constant quality control supervision and checking of every microlens/fiber pair may be required to insure that the resulting products, which are individually fabricated, are of uniform quality and all possess the required optical characteristics.

While it is known to form lenses on optical fibers by dipping the optical fibers into liquid, it is difficult to control precisely the amount of the liquid that is applied to the fiber. Consequently, it is difficult to form consistent-size, precisely dimensioned lenses on optical fibers simply by dipping the fiber ends into liquid.

Thus, there exists a need for a fast, precise and inexpensive system for affixing microlenses to optical fibers.

SUMMARY OF THE INVENTION

The present invention is directed to the arrangement and fabrication of an optical fiber assembly having an optical fiber and a microlens joined to the face of the optical fiber, the microlens being made from a pre-dispensed droplet of liquid, which liquid maintains its droplet shape and adheres to the face. The microlens can be shaped to guide light between its surface and the core of the optical fiber.

The optical fiber assembly can be made by applying a pre-dispensed droplet of liquid to the optical fiber, the liquid having properties such that the droplet is stable and holds its shape until contacted by the optical fiber. The liquid is adhered to the optical fiber as a droplet at the optical fiber's face, and the droplet solidified to form the microlens on the face of the optical fiber. If desired, the shape of the droplet can be changed as it solidifies, for example, by an applied electrical field. Changing the droplet's shape changes the resulting microlens' optical properties.

BRIEF DESCRIPTION OF THE DRAWINGS

In the drawing figures, which are not to scale, and which are merely illustrative, and wherein like reference characters denote similar elements throughout the several views.

DESCRIPTION OF THE PREFERRED EMBODIMENT

Figure 1:
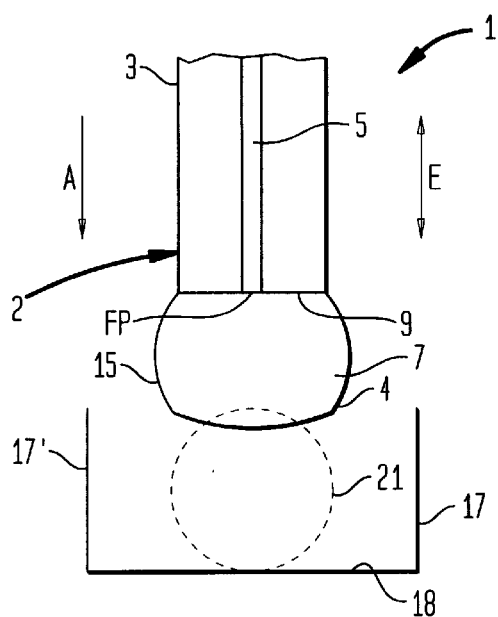
FIG. 1 is a front cross-sectional view of a microlens assembly formed in accordance with the present invention.

FIG. 1 depicts a microlens assembly 1 prepared in accordance with the present invention. As will be explained in greater detail below, the present invention involves both the structure and fabrication of a new type of microlens assembly 1.

This microlens assembly 1 includes an optical fiber 2, in which cladding 3 surrounds core 5. By way of non-limiting example, the core 5 could be on the order of 9 μm in diameter, and the cladding 3 could be on the order of 125 μm in diameter for a typical glass single-mode fiber. Also by way of non-limiting example, for a typical plastic multi-mode fiber (such as Lucent's Lucida® prototype plastic fiber) the core 5 could be on the order of 120 μm in diameter, and the cladding 3 could be on the order of 200 μm in diameter. The core 5 and cladding 3 terminate at face 9, which is preferably both flat and oriented perpendicular to the axis of the fiber. Flat face 9 can be prepared in known fashion. Optical fibers of the type just described are themselves known and commercially available, and this invention is also applicable to any suitable fibers which are now known or hereafter developed. Since by itself optical fiber 2 is conventional, the precise optical properties of the cladding 3 and core 5 which enable the transmission of light through optical fiber 2 are themselves known, and so need not be discussed in detail herein.

With continued reference to FIG. 1, microlens 7, which has a surface 4, is joined to optical fiber 2 at face 9. Microlens 7 has a focal point FP which is preferably located on or near face 9 at the center of core 5 (while it is presently thought to be preferable to have the focal point located right at the edge of the fiber, depending upon the optimal launch conditions for a particular fiber, the focal point also could be located some distance away from the fiber edge. By way of non-limiting example, the microlens 7 could be approximately 2.7 mm long by approximately 1.4 mm in diameter at its widest point and the surface 4 of the microlens 7 could have a curvature of approximately 0.8 mm.

Figure 2:
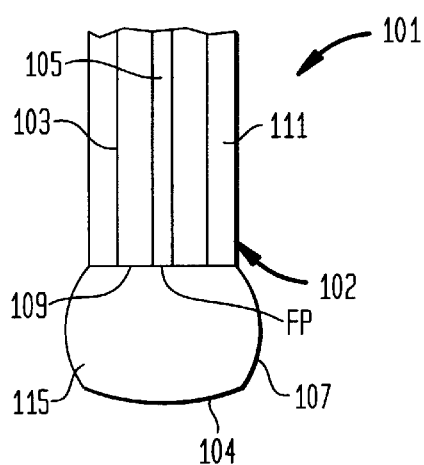
FIG. 2 is a front cross-sectional view of a second embodiment of microlens assembly in accordance with the present invention, wherein an optical fiber is bordered by a ferrule.

FIG. 2 depicts an alternate embodiment of the present invention wherein microlens assembly 101 includes an optical fiber 102 having a core 105 surrounded by cladding 103. Cladding 103 is in turn surrounded by ferrule 111 which serves to support and strengthen the optical fiber 102. By way of non-limiting example, ferrule 111 can have a diameter of approximately 1.25 mm, and be approximately 6 mm long. Typically ferrules are made out of ceramics, glass, metal, or plastic. Microlens 107 is attached to optical fiber 102 at face 109. As shown in FIG. 2, the microlens 107 has a focal point FP located on face 109, preferably at the center of core 105 of the optical fiber 102.

Figure 3:
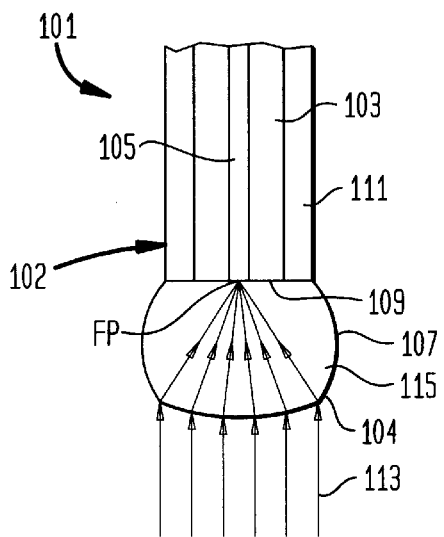
FIG. 3 is a front cross-sectional view showing the passage of light through the microlens assembly of FIG. 2.

Turning now to FIG. 3, a beam of light 113 is shown striking the surface 104 of microlens 107 and traveling into the microlens 107. Beam 113 is preferably coherent and the light rays of the beam 113 are preferably parallel. Owing to the curvature and composition of microlens 107, the light refracts at surface 104 in accordance with known principles of optics and is thereby redirected toward the focal point FP. Since focal point FP is located at the center of the core 105, the light enters core 105 and propagates along the optical fiber 102 in known fashion. The light propagating through the optical fiber 102 can be coherent and the light waves essentially parallel.

It also will be understood that light can travel through this invention in the reverse manner. In the example depicted in FIG. 3, coherent light passing through the optical fiber 102 travels along core 105, leaves the core 105 at focal point FP and enters microlens 107. The light then travels through microlens 107 to the surface 104 of microlens 107, where, owing to the optical properties of the microlens 107 the light refracts and leaves as beam 113. Microlens 107 can be suitably dimensioned so that beam 113 emerging from surface 104 is generally coherent and the light waves are parallel.

It will be appreciated that light travels through the embodiment of this invention shown in FIG. 1 in the same manner as has been described in connection with FIG. 3.

Next, schemes for forming microlenses on optical fibers in accordance with the present invention will be described.

By way of non-limiting example, and with reference to FIG. 1, microlens 7 can be formed from a pre-dispensed droplet of liquid 21 such as the melt of a polymer or a monomeric liquid. Such material should be sufficiently stable for the dispensed droplet 21 to hold its shape after formation, until contacted to the optical fiber 2. Examples of such materials include poly(methyl methacrylate) (PMMA) and other transparent acrylic polymers. The pre-dispensed droplet of liquid 21 is preferably applied to the face 9 of the optical fiber 2 by positioning the optical fiber 2 in a generally vertical orientation with the face 9 of the optical fiber 2 pointing generally downward. The optical fiber 2 is then lowered in the direction of arrow A toward a non-sticking surface of a container 17 containing the pre-dispensed droplet of liquid 21 so that the end face 9 of the optical fiber 2 contacts the pre-dispensed droplet of liquid 21. It is presently thought to be preferable to move the optical fiber 2 directly downward until the end face 9 of the optical fiber 2 contacts the surface of the pre-dispensed droplet of the liquid 21. The optical fiber is then raised upward so that a droplet 15 of the liquid 21 having the desired size and shape adheres to the end face 9 of the optical fiber 2.

As shown in FIG. 1, container 17 has a raised edge 17' which helps to confine pre-dispensed droplet 21. Other arrangements could be used; for example, a concave or "bowl-shaped" container 17 also could be used. Likewise, different height edges 17' could be employed. Any suitable non-stick surface 18 which allows the pre-dispensed droplets to maintain their shape without wetting the inside of the container 17 could be used.

After a droplet 15 having the desired shape is formed, the droplet 15 is solidified. By way of non-limiting example, this can be done through cooling in the case where the droplet 15 is made from polymer melt, or by a polymerization reaction in the case where the droplet 15 is made from a monomeric liquid. Any other suitable technique for hardening the droplet 15 also could be used.

The shape of the droplet 15 which becomes the lens 7 is determined by the interplay of such factors as the volume of the liquid droplet 15. As shown in FIGS. 4A–D, by appropriately selecting the volume of the droplet 15 it is possible to adjust the shape of the droplet surface 4 which will act as microlens 7 (FIG. 4D establishes the coordinate X-Y axes which are used).

The volume of the droplet 15 can be selected based upon the following considerations: the diameter of the optical fiber 2 or, if as shown in FIG. 2 a ferrule 111 is used, the diameter of both the optical fiber 102 and the ferrule 111, the refractive index of the liquid forming the droplet 115; the specific density of the liquid forming the droplet 115; the surface tension of the liquid forming the droplet 115; in the case where a polymer melt is used, the coefficient of thermal expansion of the molten liquid and the temperature dependence of its refractive index or, in the case where the droplet is formed from a monomeric liquid, the polymerization shrinkage of that monomeric liquid and its refractive index change due to polymerization; the surface tension of the liquid which becomes the microlens 2 or 102; and, the force of gravity.

If desired, the shape of the droplet 15 also can be altered by using electrostatic force to deform the droplet 15 before or during the process of its hardening into the microlens 7. The electrostatic force can be generated by charging a pre-dispensed droplet of liquid 21. The applied electric field E then exerts electrostatic force on the droplet 15 which is proportional to its charge, and that electrostatic force will alter the shape of the liquid droplet 15 as it hardens into the lens 107.

Alternatively, one can apply electric field E without charging the droplet. In this case the droplet elongation will be proportional to the dielectric susceptibility (and thus to dielectric permittivity) of the droplet material.

It will be appreciated that the droplet 15 can be elongated by suitably changing the magnitude and direction of the applied electrical field E, and the extent to which the droplet 15 is deformed can be controlled by suitably selecting the magnitude of the applied electrical field E. More specifically, where an applied electrical field E is used to deform the droplet 115, the absolute value and direction of the electric field vector, droplet charge, and the dielectric permittivity of the droplet material will affect the force applied to the droplet 115. The exact value of the force deforming the droplet 115 can be either calculated using standard equations of electrodynamics, or, in many practical settings, determined experimentally for a given droplet size, material, and desired elongation.

Although the applied electrical field shown in FIG. 1 is depicted as being vertically-oriented and is thought to be preferable, other field orientations are contemplated and within the scope of this invention.

With reference to FIG. 2, microlens 107 can be formed on the end face 109 of optical fiber 102 in the manner just described.

With reference now to FIGS. 4A–D, and for the purposes of this invention, the shape of a liquid droplet 215, 315, 415, can be modeled using the following equations to perform a quantitative analysis of the droplet shape:

$$\frac{d^2\hat{x}}{dy^2} - (1-\gamma\hat{y})\left[1+\left(\frac{d\hat{x}}{d\hat{y}}\right)^2\right]^{3/2} - \frac{1}{\hat{x}}\left[1+\left(\frac{d\hat{x}}{d\hat{y}}\right)^2\right] = 0 \quad (1)$$

where $$\hat{x} = \beta x \quad (2)$$

$$\hat{y} = \beta y \quad (3)$$

$$\frac{1}{\beta} = \sqrt{\frac{\gamma}{\alpha}} \quad (4)$$

$$\alpha = \frac{\rho g}{\Gamma} \quad (5)$$

where $\gamma$ is an arbitrary dimensionless parameter which determines the characteristic size of the droplet, $\rho$ is specific gravity of the liquid, $\Gamma$ is the liquid surface tension, and g is acceleration due to gravity, taken with a negative sign.

In order to obtain the shape of the droplet Eq. (1) should be solved with the following boundary conditions:

$$\hat{x}(\hat{y}=0) = 0$$

$$\hat{x}(\hat{y}=0) = 0 \text{ and } \left|\frac{d\hat{x}}{d\hat{y}}\right|_{\hat{y}=0} \to \infty \quad (6)$$

Focal length of the droplet described by Eq. (1) with boundary conditions (6) is defined by the following equation:

$$\hat{f} = 2\left(1 + \frac{1}{n-1}\right) \quad (7)$$

where n is refractive index of the droplet material.

The volume of the droplet that has its overall length exactly equal to its focal length is determined as:

$$\hat{V} = \pi \int_0^{\hat{f}} (\hat{x}(\hat{y}))^2 d\hat{y} \quad (8)$$

where $\hat{V} = \beta^3$ Volume and Volume is the droplet volume.

Figure 4A:
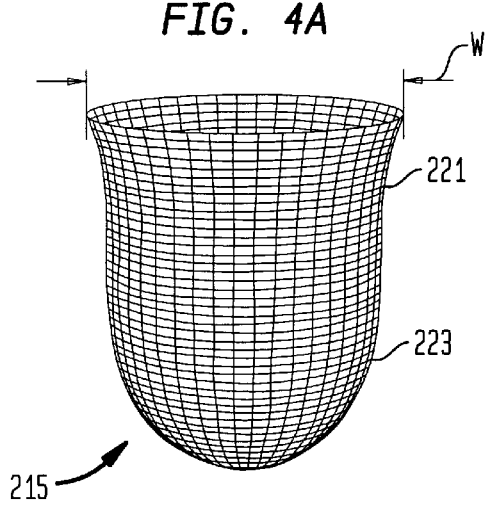
FIGS. 4A–D are views of wire-mesh models showing how various parameters affect microlens formation.
Figure 4B:
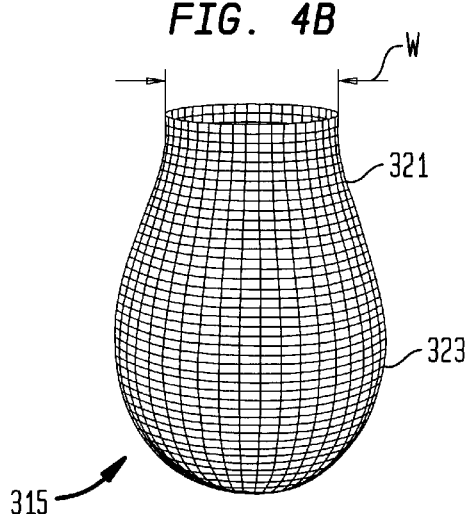
Figure 4C:
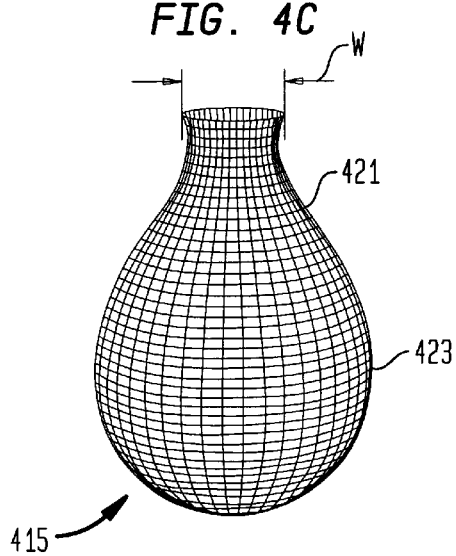
Figure 4D:
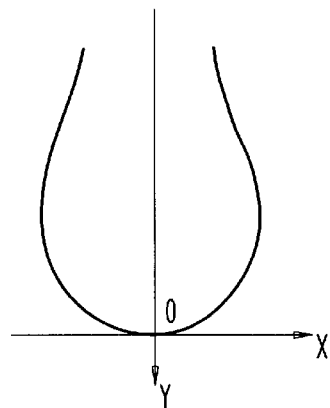

Several examples of the possible solutions of Eqs.(1)–(8) are shown in FIGS. 4A–4C. Each of the droplets 215, 315, 415 depicted in FIGS. 4A–C has a neck region 221, 321, 421 and a bulge region 223, 323, 423. The width of the base of the droplets 215, 315, 415 is $\hat{w}$, the overall length is $\hat{l}$, and the volume is $\hat{V}$. The droplets are shown in dimensionless coordinates $\hat{x}$ and $\hat{y}$. In order to translate them to the actual coordinates x and y one needs to use Eqs. (2)–(5). For the case where the liquid is a PMMA melt ($\Gamma = 33 \cdot 10^{-3}$ N m$^{-1}$, $\rho = 1.18 \cdot 10^3$ kg m$^{-3}$, n=1.49) such translation results in the following 1. for $\gamma = -0.15$ (FIG. 4A) we have $1/\beta = 653$ $\mu$m and thus:
   $\hat{l} = 6.08$ translates into l=3977 $\mu$m
   $\hat{w} = 5.21$ translates into w=3407 $\mu$m
   $\hat{V} = 90.17$ translates into V=25.2 $\mu$l
2. for $\gamma = -0.10$ (FIG. 4B) we have $1/\beta = 534$ $\mu$m and thus:
   $\hat{l} = 6.08$ translates into l=3247 $\mu\mu$m
   $\hat{w} = 2.68$ translates into w=1431 $\mu$m
   $\hat{V} = 61.99$ translates into V=9.4 $\mu$l
3. for $\gamma = -0.07$ (FIG. 4C) we have $1/\beta = 447$ $\mu$m and thus:
   $\hat{l} = 6.08$ translates into l=2717 $\mu$m
   $\hat{w} = 1.41$ translates into w=630 $\mu$m
   $\hat{V} = 49.36$ translates into V=4.4 $\mu$l Comparing FIGS. 4A–C, it can be seen from the droplets shown that the droplets 215, 315, 415 become progressively more contoured; the neck 421 of droplet 415 is much more pronounced than the neck 221 of droplet 215. The droplet 415 might be suitable for the use with the plastic optical fiber such as Lucida® fiber described above. On the other hand, the droplet 315, which has a larger neck, might be suitable for the use with the fiber enclosed in a ferrule, similar to the one, described above.

Figure 5:
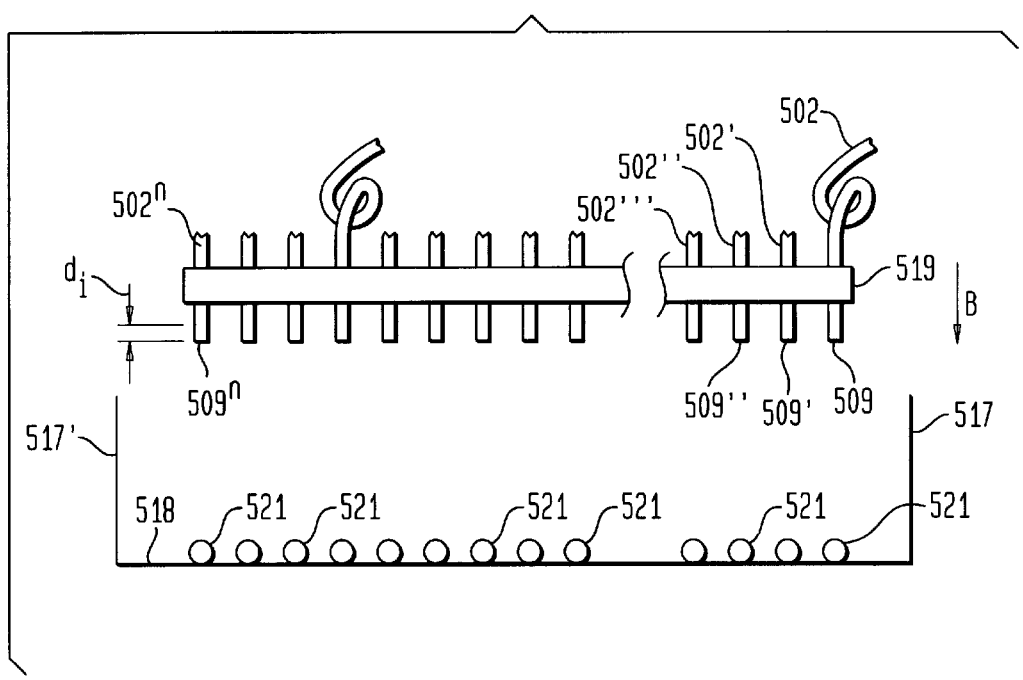
FIG. 5 is a front elevational view showing a number of optical fibers being dipped into liquid to form microlenses thereon.

This invention lends itself to the fabrication in quantity of microlens assemblies. One embodiment for manufacturing multiple optical fibers with microlenses mounted thereon is depicted in FIG. 5 (for clarity, only portions of the optical fibers are shown). As depicted therein, a group of optical fibers 502, 502', 502" . . . 502$^n$ are each secured to a frame 519 such that the faces 509, 509', 509" . . . 509$^n$ of the optical fibers 502, 502', 502" . . . 502$^n$ project downward beneath the frame 519. The frame 519 is then lowered in the direction of arrow B so that the faces 509, 509', 509" . . . 509$^n$ are brought into contact with the pre-dispensed droplets of the liquid 521 that, when solidified, will form the microlenses (not shown). By way of non-limiting example, in the embodiment depicted in FIG. 5, the frame 519 can be lowered until the faces 509, 509', 509" . . . 509$^n$ of the optical fibers 502, 502', 502" . . . 502$^n$ are just touch the surface of the pre-dispensed droplets of the liquid 521.

In the same manner as the embodiment depicted in FIG. 1, container 517 shown in FIG. 5 has a raised edge 517' which helps to confine pre-dispensed droplets 521. Other arrangements could be used; for example, a concave or "bowl-shaped" container 517 (not shown) also could be used. Likewise, different height edges 517' could be employed. Any suitable surface 518 which allows the pre-dispensed droplets 521 to maintain their shape without wetting the inside of the container 517, such as a non-stick surface, could be used.

The present invention offers the following advantages when compared with existing techniques for attaching microlenses to optical fibers.

During formation in accordance with the present invention, surface tension of the liquid applied to the optical fiber will cause the microlens to be automatically aligned with the center of the fiber core, and the focal length of the lens is adjusted to the edge (end face) of the fiber. Thus, the expensive equipment and slow alignment procedure of traditional processing required to achieve such positioning can be avoided.

A further benefit of the present invention is that the surface of the lens material does not contact foreign objects, ensuring that the lens surface will be very smooth. This should reduce scattering losses of the lens.

The present invention is inherently parallel, allowing simultaneous formation of many microlenses on a fiber array or ribbon.

The present invention may be very cost effective and should not require expensive equipment or materials.

Thus, while there have been shown and described and pointed out fundamental novel features of the invention as applied to exemplary embodiments thereof, it would be understood that various omissions and substitutions and changes in the form and details of the disclosed invention may be made by those skilled in the art without departing from the spirit of the invention. It is the intention, therefore, to be limited only as indicated by the scope of the claim appended hereto.

What is claimed is:

1. An optical fiber assembly, comprising:

an optical fiber with at least a portion thereof surrounded by a ferrule, said optical fiber and ferrule having a common face; and a microlens joined to the face of the optical fiber and ferrule, the microlens being made from a pre-dispensed droplet of a liquid which adheres to the face such that a focal point of said microlens is located at a predetermined point with respect to said face.

2. An optical fiber assembly according to claim 1, wherein the microlens directly contacts the face of the optical fiber and ferrule.

3. An optical fiber assembly according to claim 1, wherein the microlens has a surface and the optical fiber has a core, and the microlens has a focal point such as to establish an optical path between the surface of the microlens and the core.

4. An optical fiber assembly according to claim 1, wherein the microlens comprises a transparent polymeric material.

5. An optical fiber assembly according to claim 1, wherein the transparent polymeric material comprises an acrylic polymer.

6. An optical fiber assembly according to claim 1, wherein the transparent polymeric material comprises PMMA.

7. A method of preparing an optical fiber assembly, comprising the steps of:

applying a pre-dispensed liquid droplet to an optical fiber having a face, the droplet adhering to the optical fiber at the face; and solidifying the droplet to form a microlens joined to the face of the optical fiber, the method further comprising the step of altering a shape of the droplet at least one of before or during the step of solidifying by: applying a charge to the pre-dispensed liquid droplet; and generating an electric field around the droplet, wherein the electric field interacts with the charge on droplet to apply force to the droplet, thereby altering the shape of the droplet.

8. A method of preparing an optical fiber as in claim 7, wherein said shape of said droplet is altered such that said microlens has a focal point at a predetermined point with respect to said face.

9. A method of preparing an optical fiber assembly, comprising the steps of:

applying a pre-dispensed liquid droplet to an optical fiber having a face, the droplet adhering to the optical fiber at the face; and solidifying the droplet to form a microlens joined to the face of the optical fiber, the method further comprising the step of altering a shape of the droplet at least one of before or during the step of solidifying by generating an electric field around the pre-dispensed droplet, wherein the electric field interacts with the droplet to apply force to the droplet, thereby altering the shape of the droplet.

10. A method of preparing an optical fiber as in claim 9, wherein said shape of said droplet is altered such that said microlens has a focal point at a predetermined point with respect to said face.

11. A method of preparing an optical fiber assembly comprising the steps of:

applying a pre-dispensed liquid droplet to an optical fiber having a face, the droplet adhering to the optical fiber at the face, said droplet being pre-dispensed in an amount selected to form a microlens upon solidification thereof having a focal point at a predetermined point with respect to the face of said optical fiber; and solidifying the droplet to form a microlens joined to the face of the optical fiber.

12. A method of preparing an optical fiber assembly as in claim 11, wherein the liquid has at least one property which affects a shape of the droplet during the step of solidifying, said method further comprising the step of determining said amount based at least in part on said property.

13. A method of preparing an optical fiber assembly as in claim 12, wherein the at least one property includes at least one of a refractive index of the liquid, a specific density of the liquid, and a surface tension of the liquid.

14. A method of preparing an optical fiber as in claim 11, wherein the liquid is a monomeric liquid; and the shape of the droplet is affected by a surface tension of the liquid.

15. A method of preparing an optical fiber as in claim 11, wherein the optical fiber is one of a plurality of optical fibers supported by movable frame.

16. A method of preparing an optical fiber assembly as in claim 11, wherein the optical fiber has at least one property which affects a shape of the droplet during the step of solidifying, said method further comprising the step of determining said amount based at least in part on said property.

17. A method of preparing an optical fiber assembly as in claim 16, wherein the at least one property includes at least one of a diameter of the optical fiber and a diameter of a ferrule surrounding at least a portion of the optical fiber.

18. A method of preparing an optical fiber assembly as in claim 11, wherein the optical fiber has at least one property which affects a shape of the droplet during the step of solidifying and wherein said liquid has at least one property which affects a shape of the droplet during the step of solidifying, said method further comprising the step of determining said amount based at least in part on said at least one property of said optical fiber and said at least one property of said liquid.

* * * * *